United States Patent
Kanemoto et al.

(10) Patent No.: US 6,862,458 B2
(45) Date of Patent: Mar. 1, 2005

(54) TRANSMISSION POWER CONTROL APPARATUS AND TRANSMISSION POWER CONTROL METHOD

(75) Inventors: Hideki Kanemoto, Yokosuka (JP); Osamu Kato, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 492 days.

(21) Appl. No.: 09/959,634

(22) PCT Filed: Mar. 22, 2001

(86) PCT No.: PCT/JP01/02287

§ 371 (c)(1),
(2), (4) Date: Nov. 1, 2001

(87) PCT Pub. No.: WO01/73976

PCT Pub. Date: Oct. 4, 2001

(65) Prior Publication Data

US 2002/0160799 A1 Oct. 31, 2002

(30) Foreign Application Priority Data

Mar. 28, 2000 (JP) .......................................... 2000-89279

(51) Int. Cl.$^7$ ................................................ H04B 1/40
(52) U.S. Cl. ........................ 455/522; 455/67.13; 455/69
(58) Field of Search ............................ 455/522, 68, 69, 455/70, 67.11, 67.13

(56) References Cited

U.S. PATENT DOCUMENTS

| | | | |
|---|---|---|---|
| 5,873,028 A | 2/1999 | Nakano et al. | |
| 5,946,346 A | * | 8/1999 | Ahmed et al. .......... 455/522 X |
| 6,341,214 B2 | 1/2002 | Uesugi | |
| 6,341,224 B1 | * | 1/2002 | Dohi et al. .................. 455/522 |
| 6,526,261 B1 | * | 2/2003 | Takeuchi et al. .............. 455/69 |
| 6,549,785 B1 | * | 4/2003 | Agin .......................... 455/522 |

FOREIGN PATENT DOCUMENTS

| | | |
|---|---|---|
| CN | 1123976 | 6/1996 |
| CN | 1198274 | 11/1998 |
| JP | 08181653 | 7/1996 |
| JP | 11331072 | 11/1999 |
| JP | 2000138633 | 5/2000 |
| KR | 19990045280 | 6/1999 |
| WO | 9750197 | 12/1997 |

* cited by examiner

Primary Examiner—Nay Maung
Assistant Examiner—Philip J. Sobutka
(74) Attorney, Agent, or Firm—Stevens, Davis, Miller & Mosher, LLP

(57) ABSTRACT

A received SIR value measurement section 107 measures a received SIR (desired signal to interference ratio) value. A target SIR value setting section 108 decreases a target SIR value by a predetermined first value if the quality of received data from a demodulation section 106 is better than the desired quality, or increases the target SIR value by a second value greater than the first value if the quality of the received data is poorer than the desired quality. An SIR comparison/information generating section 109 generates transmission power control information for implementing a directive to the transmitting station to increase or decrease transmission power so that a difference between the received SIR value and the set target SIR value is eliminated. By this means, it is possible to prevent delay in updating of the target SIR value and to assure communication quality even in a case where the propagation environment deteriorates rapidly, when target SIR value updating is carried out at the time of transmission power control by means of comparison between the received SIR value and target SIR value.

7 Claims, 8 Drawing Sheets

TRANSMISSION POWER CONTROL APPARATUS AND TRANSMISSION POWER CONTROL METHOD

TECHNICAL FIELD

The present invention relates to a transmission power control apparatus and transmission power control method to be applied to a mobile telephone set, a mobile station apparatus such as an information terminal apparatus provided with mobile telephone functions and computer functions, or a base station apparatus that performs radio communication with a mobile station apparatus, or the like, in a mobile communication system.

BACKGROUND ART

Conventionally, in a CDMA (Code Division Multiple Access) mobile radio communication cellular system, transmission power control is carried out in both a mobile station apparatus and a base station apparatus in order to ensure adequate communication quality in the receiving-party station apparatus, and to prevent excessive interference being imposed on another station apparatus.

Within transmission power control, also, with a method whereby control is performed on the basis of a desired signal (post-demodulation desired signal power) to interference ratio (SIR value), an increase or decrease in transmission power is determined by measuring a received SIR value at a receiving station apparatus and comparing it with a preset target SIR value, and this transmission power control information is conveyed to the transmitting station apparatus.

That is to say, transmission power control information directs transmission power to be increased if the received SIR value is smaller than the target SIR value, and directs transmission power to be decreased if the received SIR value is greater than the target SIR value.

The transmitting station apparatus performs transmission power control based on the conveyed transmission power control information. The target SIR value is set so that received signals ensure the necessary communication quality over a long period, and since fluctuations of the received signals are anticipated, a margin is added to an SIR value for securing the necessary communication quality to set the target SIR value.

Here, if there are few fluctuations in the received signals, such as when both the transmitting station apparatus and receiving station apparatus are stationary, the margin will be greater than is necessary, and the transmission power of the transmitting station apparatus will be greater than is necessary.

For this reason, there is a disadvantage in that unnecessary transmission power is consumed by a transmitting station apparatus, and moreover that the capacity that can be accommodated by a system is reduced because interference imposed on other station apparatuses increases.

As a technology for overcoming this disadvantage, there has been disclosed in Unexamined Japanese Patent Publication No. 8-181653 the setting of a target SIR value by varying the margin to be added to a desired SIR value according to the amount of fluctuation of a received SIR value.

This conventional technology is effective when performing target SIR value setting when a mobile station apparatus is stationary, for example, and upward-and-downward fluctuations of the received SIR value are small.

However, the moment a mobile station apparatus begins to move from a stationary state, for instance, upward-and-downward fluctuations of the received SIR value become large. In this case, a delay occurs in updating of the target SIR value.

That is to say, the moment a mobile station apparatus begins to move from a stationary state, for instance, there is a major change in the propagation environment surrounding the mobile station apparatus from quasi-static characteristics to dynamic characteristics, with the probable result that signal quality deteriorates rapidly, the required received SIR value cannot be ensured with the target SIR value set in the stationary state, and communication quality deteriorates.

In such as case, if the target SIR value has been made on the basis of long-term communication quality, there is a problem in that updating of the target SIR value will not be in time, and it will not be possible to perform transmission power control responsive to rapid deterioration of communication quality.

DISCLOSURE OF INVENTION

It is an object of the present invention to provide a transmission power control apparatus and transmission power control method that enable delay in updating of a target SIR value to be prevented and communication quality to be assured even in a case where the propagation environment deteriorates rapidly, when target SIR value updating is carried out at the time of transmission power control by means of comparison between a received SIR value and target SIR value.

This object is achieved by having transmission power control track a deteriorating propagation environment at high speed by shortening a time required to update the target SIR value to increase when setting a target SIR value for transmission power control.

BEST MODE FOR CARRYING OUT THE INVENTION

With reference now to the accompanying drawings, embodiments of the present invention will be explained in detail below.

Embodiment 1

Figure 1:
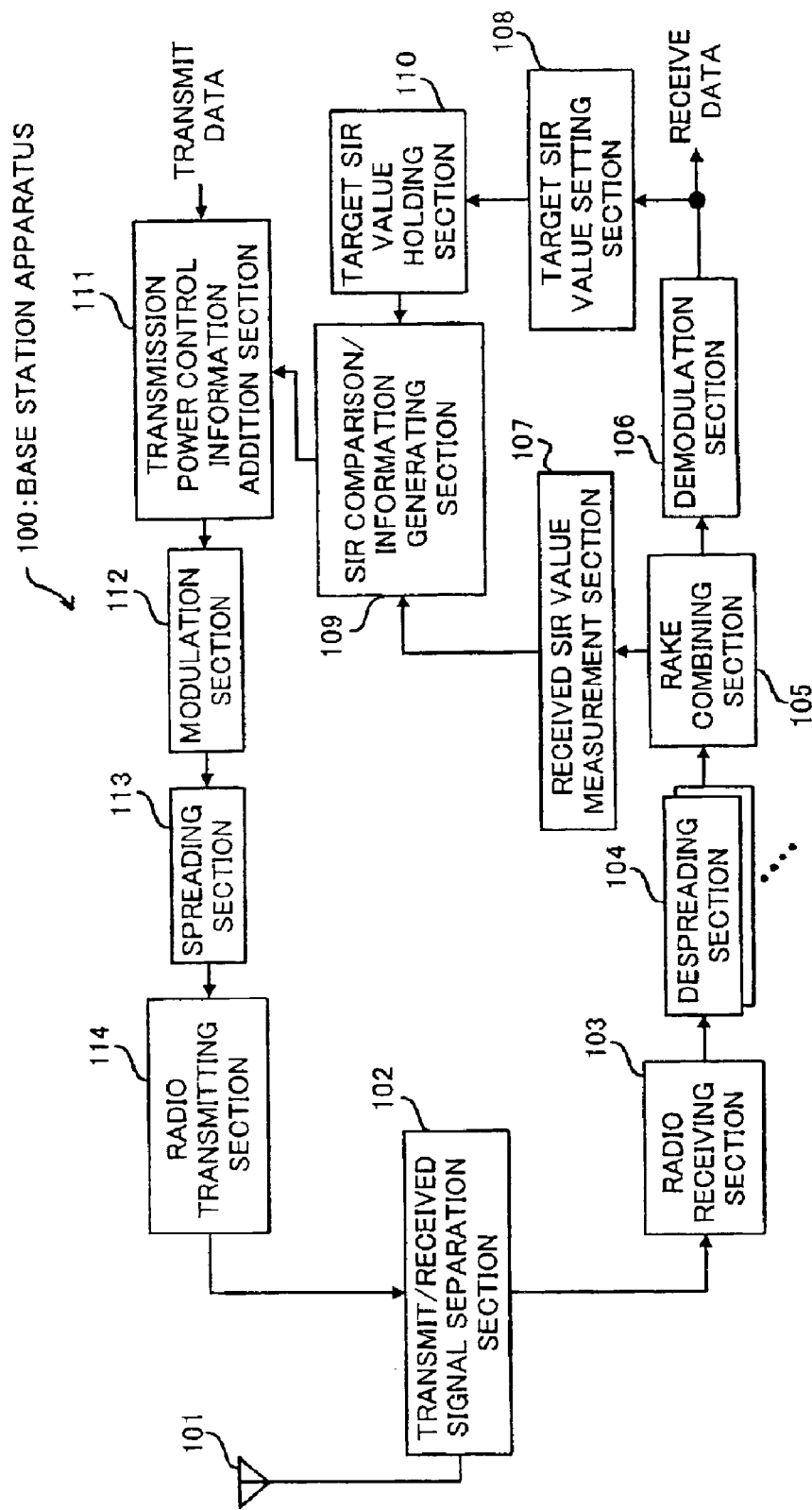
FIG. 1 is a block diagram showing the configuration of a base station apparatus using a transmission power control apparatus according to Embodiment 1 of the present invention.

FIG. 1 is a block diagram showing the configuration of a base station apparatus using a transmission power control apparatus according to Embodiment 1 of the present invention.

A feature of Embodiment 1 is that the required communication quality is ensured by having transmission power control track a deteriorating propagation environment at high speed by shortening a time required to update the target SIR value to increase when setting a target SIR value for transmission power control.

The base station apparatus 100 shown in FIG. 1 is composed of an antenna 101, transmit/received signal separation section 102, radio receiving section 103, despreading section 104, RAKE combining section 105, demodulation section 106, received SIR value measurement section 107, target SIR value setting section 108, SIR comparison/information generating section 109, target SIR value holding section 110, transmission power control information addition section 111, modulation section 112, spreading section 113, and radio transmitting section 114.

The antenna 101 performs transmission and reception of signals to and from a mobile station apparatus 200. The transmit/received signal separation section 102 outputs a signal output from the radio transmitting section 114 to the antenna 101, and outputs a signal received at the antenna 101 to the radio receiving section 103. The radio receiving section 103 performs predetermined radio processing on an output signal from the transmit/received signal separation section 102, and the despreading section 104 performs despreading on an output signal from the radio receiving section 103. The RAKE combining section 105 performs RAKE combining on an output signal from the despreading section 104, and the demodulation section 106 performs demodulation on an output signal from the RAKE combining section 105 and extracts received data.

The received SIR value measurement section 107 performs measurement of a received SIR value from an output signal from the RAKE combining section 105. The target SIR value setting section 108 performs target SIR value setting based on an output signal from the demodulation section 106. Details of the target SIR value setting operation in the target SIR value setting section 108 will be given later.

The SIR comparison/information generating section 109 compares a received SIR value with the target SIR value, and generates transmission power control information so as to make the received SIR value match the target SIR value.

Details of the operation for generating transmission power control information in the SIR comparison/information generating section 109 will be given later.

The target SIR value holding section 110 holds a target SIR value set by the target SIR value setting section 108. The transmission power control information addition section 111 adds transmission power control information to transmit data. The modulation section 112 performs modulation on an output signal from the transmission power control information addition section 111, and the spreading section 113 performs spreading on an output signal from the modulation section 112. The radio transmitting section 114 performs predetermined radio processing on an output signal from the spreading section 113 and outputs it to the transmit/received signal separation section 102.

Figure 2:
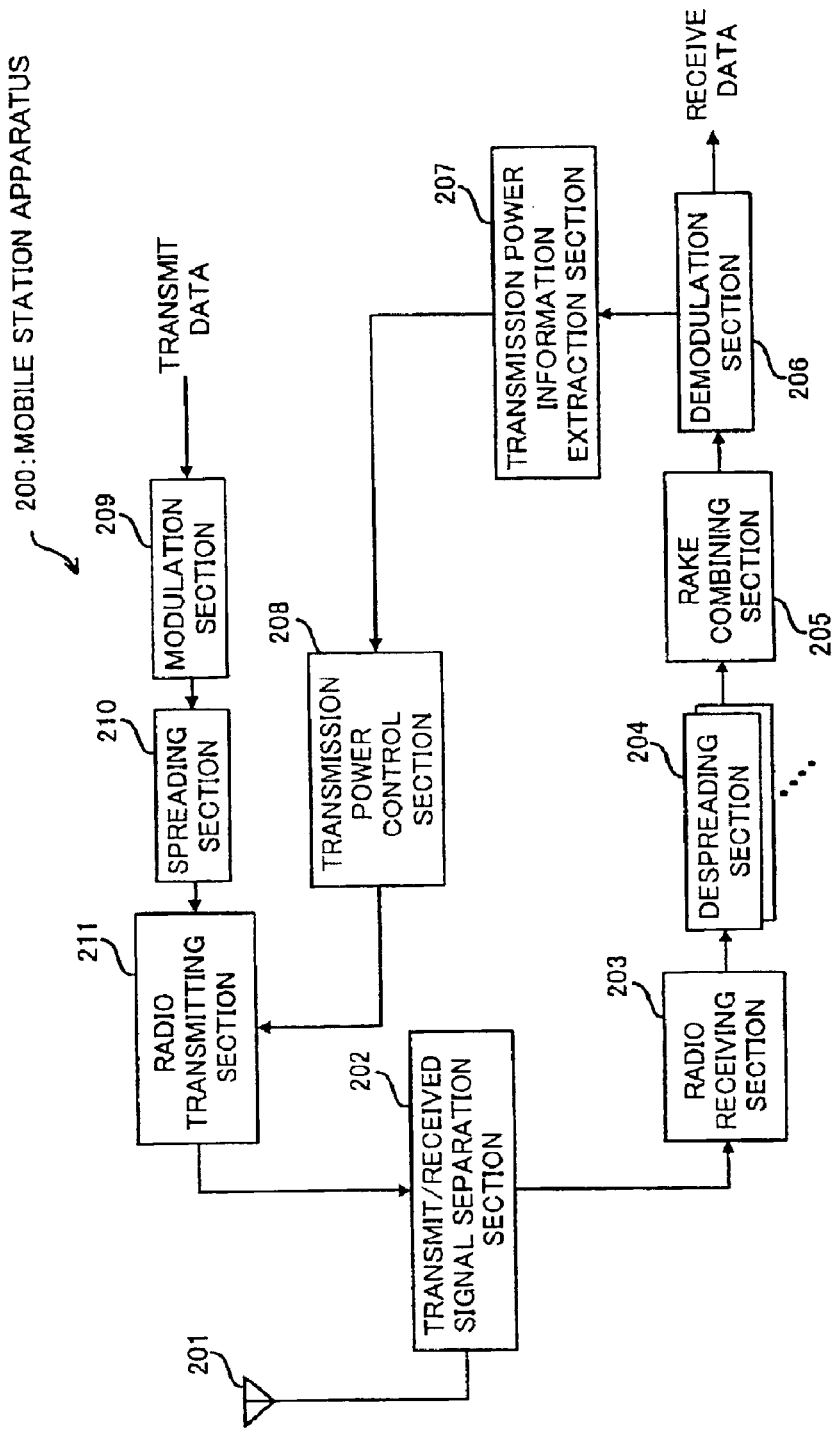
FIG. 2 is a block diagram showing the configuration of a mobile station apparatus according to Embodiment 1 of the present invention.

FIG. 2 is a block diagram showing the configuration of a mobile station apparatus according to Embodiment 1 of the present invention.

The mobile station apparatus 200 shown in FIG. 2 performs radio communication with the base station apparatus 100, and is composed of an antenna 201, transmit/received signal separation section 202, radio receiving section 203, despreading section 204, RAKE combining section 205, demodulation section 206, transmission power information extraction section 207, transmission power control section 208, modulation section 209, spreading section 210, and radio transmitting section 211.

The antenna 201 performs transmission and reception of signals to and from the base station apparatus 100. The transmit/received signal separation section 202 outputs a signal output from the radio transmitting section 211 to the antenna 201, and outputs a signal received at the antenna 201 to the radio receiving section 203. The radio receiving section 203 performs predetermined radio processing on an output signal from the transmit/received signal separation section 202, and the despreading section 204 performs despreading on an output signal from the radio receiving section 203. The RAKE combining section 205 performs RAKE combining on an output signal from the despreading section 204. The demodulation section 206 performs demodulation on an output signal from the RAKE combining section 205 and extracts received data. The transmission power information extraction section 207 extracts transmission power information from an output signal from the demodulation section 206.

The transmission power control section 208 controls transmission power according to information extracted by the transmission power information extraction section 207. The modulation section 209 performs transmit data modulation, and the spreading section 210 performs spreading on an output signal from the modulation section 209. The radio transmitting section 211 performs predetermined radio processing on an output signal from the spreading section 210, and outputs it to the transmit/received signal separation section 202.

Next, the operation will be described in the case where target SIR value setting and updating are carried out by the base station apparatus 100 when performing transmission power control between the base station apparatus 100 and mobile station apparatus 200.

After being received by the antenna 101, a signal transmitted from the mobile station apparatus 200 is output to the radio receiving section 103 via the transmit/received signal separation section 102.

After undergoing predetermined radio processing by the radio receiving section 103, this received signal is despread by the despreading section 104, and undergoes RAKE combining in the RAKE combining section 105. That is to say, the desired signal waveform is obtained by having despread signals of the same frequency raked up along the time axis.

This RAKE combining signal is demodulated by the demodulation section 106 and output as received data. The RAKE combining signal is also input to the received SIR value measurement section 107, where received SIR value measurement is carried out.

Also, received data output from the demodulation section 106 is input to the target SIR value setting section 108, where received data quality is measured by determining whether there is an error means of a CRC (Cyclic Redundancy Check) or the like. Based on the result of this measurement, a target SIR value is set. This set target SIR value is held in the target SIR value holding section 110.

Moreover, in the SIR comparison/information generating section 109, the relative sizes of the received SIR value and target SIR value are compared and transmission power control information for making the received SIR value the target SIR value is generated. This transmission information is added to transmit data by the transmission power control information addition section 111. The signal output from the transmission power control information addition section 11 undergoes primary modulation by the modulation section 112, followed by spreading processing in the spreading section 113. This spread signal is made a transmit signal by being subjected to predetermined radio processing by the radio transmitting section 114, and is transmitted from the antenna 101 via the transmit/received signal separation section 102.

Next, the operation when transmission power control is performed in the mobile station apparatus 200 will be described.

In the mobile station apparatus 200, a signal transmitted from the base station apparatus 100 is received by the antenna 201 the signal is output to the radio receiving section 203 via the transmit/received signal separation section 202.

After undergoing predetermined radio processing by the radio receiving section 203, this received signal is despread by the despreading section 204, and undergoes RAKE combining in the RAKE combining section 205. This RAKE combining signal is demodulated by the demodulation section 206 and output as received data.

Received data is also input to the transmission power information extraction section 207, where transmission power control information is extracted and output to the transmission power control section 208. In the transmission power control section 208, a transmit signal output from the radio transmitting section 211 is controlled so as to have power according to the transmission power control information extracted by the transmission power information extraction section 207.

Figure 3:
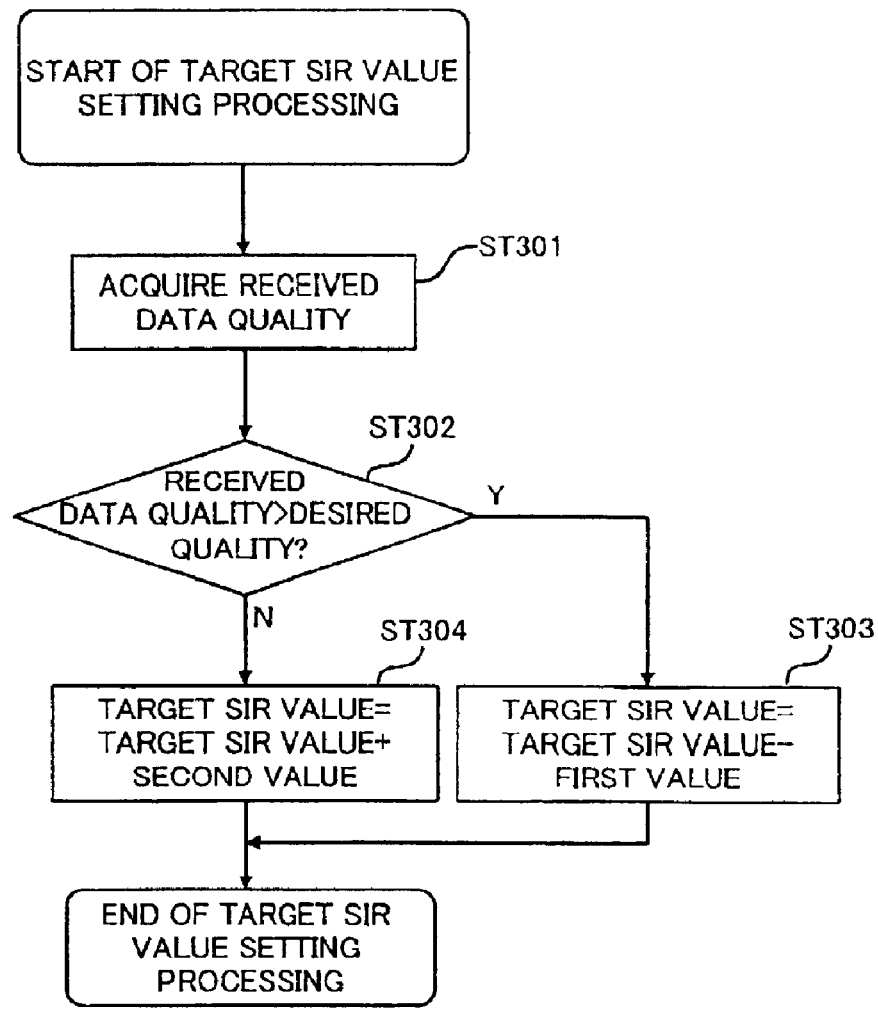
FIG. 3 is a flowchart for explaining the target SIR value setting operation in a base station apparatus using a transmission power control apparatus according to Embodiment 1 of the present invention.

Next, the target SIR value setting operation in the target SIR value setting section 108 will be described with reference to the flowchart shown in FIG. 3.

In step (hereinafter referred to as "ST") 301, the quality of received data obtained after demodulation is detected.

In ST302, that detected received data quality is compared with the desired quality, and if the received data quality is better than the desired quality, the target SIR value is decreased by a predetermined first value in ST303. If the received data quality is poorer than the desired quality, the target SIR value is increased by a predetermined second value in ST304. The target SIR value is set by means of the above operations.

Now, the second value is larger than the first value. For example, it may be that the second value=2× the first value.

Also, the target SIR value setting cycle is longer than the transmission power control cycle. For example, transmission power control may be performed every slot, and the target SIR value setting updated based on the frame error rate.

Figure 4:
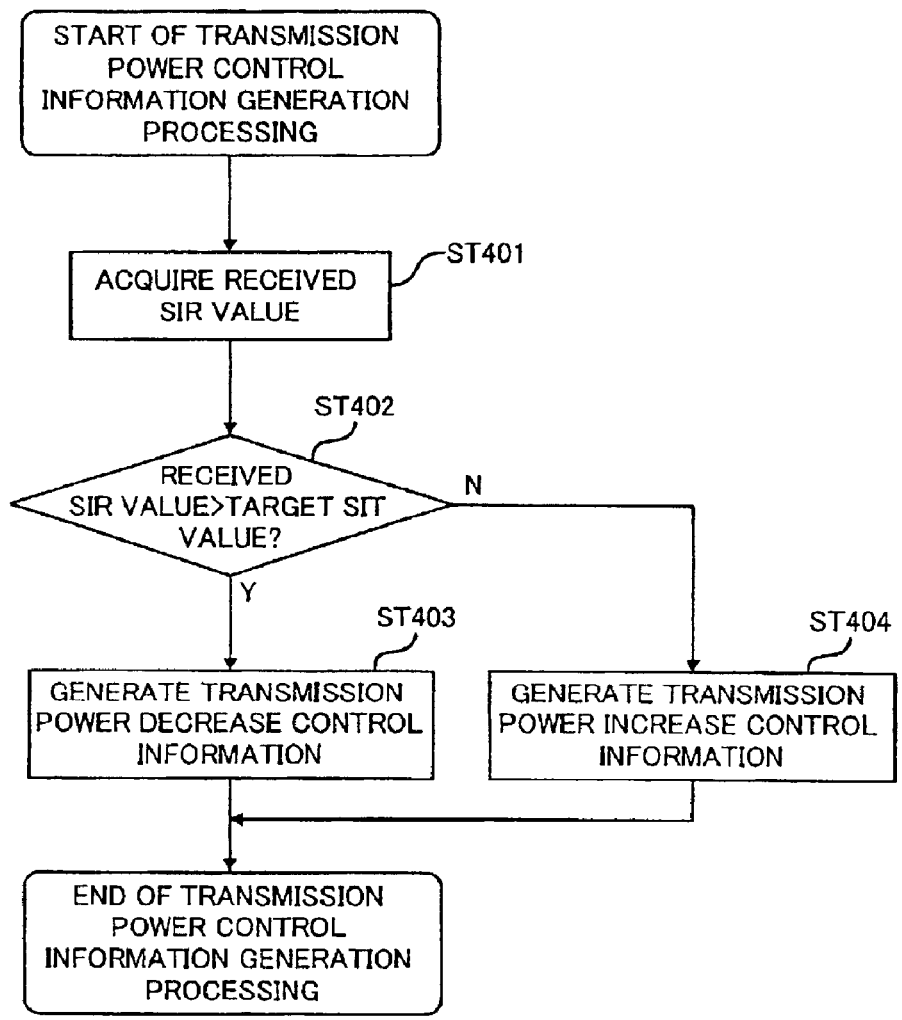
FIG. 4 is a flowchart for explaining the transmission power control information generating operation in a base station apparatus using a transmission power control apparatus according to Embodiment 1 of the present invention.

Next, the operations whereby transmission power control information is generated in the SIR comparison/information generating section 109 will be described with reference to the flowchart shown in FIG. 4.

After a received SIR value has been obtained in ST401, the received SIR value and target SIR value are compared in ST402.

If the received SIR value is larger than the target SIR value, control information for a transmission power decrease is generated in ST403, and if smaller, control information for a transmission power increase is generated in ST404.

Thus, according to a base station apparatus 100 using a transmission power control apparatus according to Embodiment 1, when the target SIR value is updated, it can be decreased by a predetermined first value or increased by a second value larger than the first value.

By this means, a time required to update the target SIR value to increase is shortened, and therefore the target SIR value can be updated at high speed. As a result, even if the propagation environment deteriorates rapidly, it is possible to increase the target SIR value at high speed and have transmission power control track that rapid deterioration, and the required communication quality can be ensured.

Embodiment 2

Figure 5:
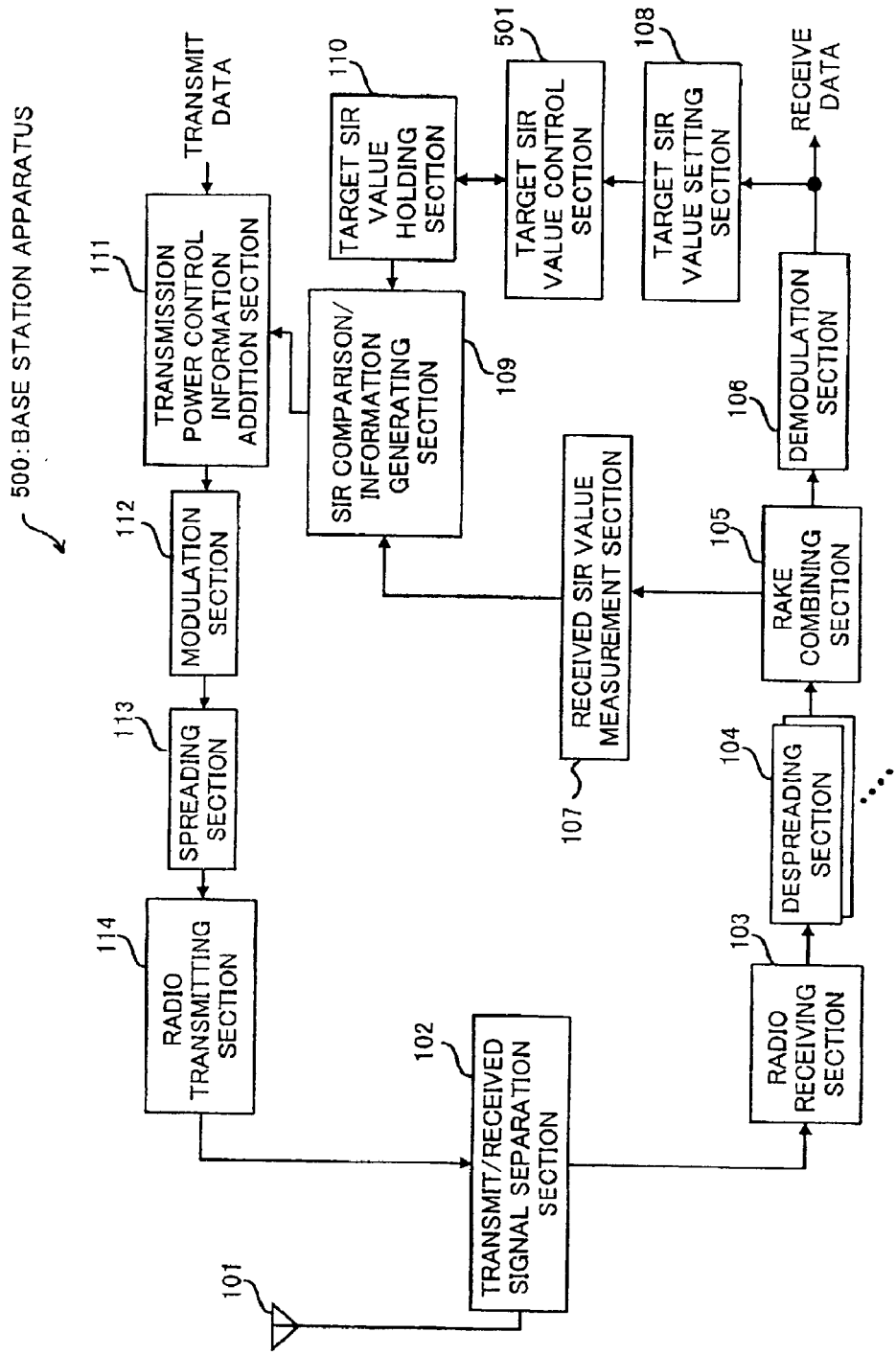
FIG. 5 is a block diagram showing the configuration of a base station apparatus using a transmission power control apparatus according to Embodiment 2 of the present invention.

FIG. 5 is a block diagram showing the configuration of a base station apparatus using a transmission power control apparatus according to Embodiment 2 of the present invention. Parts in FIG. 5 identical to those in FIG. 1 are assigned the same codes as in FIG. 1 and their detailed explanations are omitted.

A feature of Embodiment 2 is that, by providing a lower limit for target SIR value settings for a transmitting apparatus in which signal quality fluctuations are large because fluctuations in the propagation environment are large, and not setting the target SIR value excessively low, transmission power control is operated efficiently and the required communication quality is ensured even if the propagation environment deteriorates rapidly.

The base station apparatus 500 shown in FIG. 5 differs from the base station apparatus 100 in FIG. 1 in having, in addition to the configuration elements of base station apparatus 100, a target SIR value control section 501 connected between the target SIR value setting section 108 and target SIR value holding section 110.

The target SIR value control section 501 controls the target SIR value held in the target SIR value holding section 110, based on the results of communication quality measurements in the target SIR value setting section 108.

Specifically, if the setting width-the difference between the maximum value and minimum value-of the target SIR value, set within a fixed time (for example, the past 10 occasions), exceeds a predetermined threshold value, a lower limit is provided for the target SIR value (hereinafter referred to as "target SIR lower limit value"), and control is performed so that the target SIR value is not set to be equal to or less than the target SIR lower limit value.

Also, if the setting width is to be equal to or less than the threshold value, control is performed to increase or decrease the target SIR value according to the communication quality in the same way as described in Embodiment 1.

Figure 6:
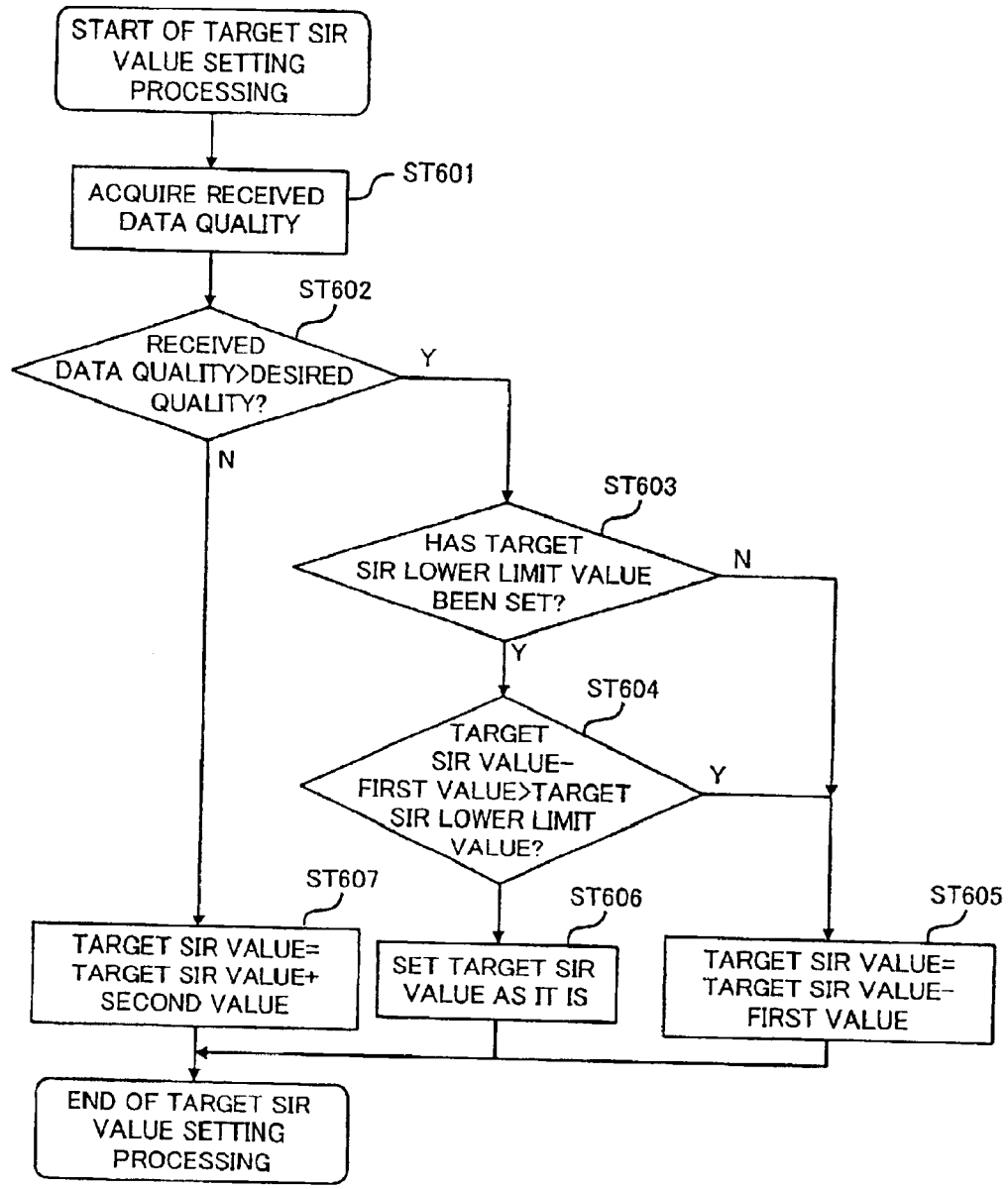
FIG. 6 is a flowchart for explaining the target SIR value setting operation in a base station apparatus using a transmission power control apparatus according to Embodiment 2 of the present invention.

Next, the operation of the target SIR value setting section 108 and target SIR value control section 501 will be described with reference to the flowchart in FIG. 6.

In ST601, the target SIR value setting section 108 acquires the quality of received data obtained by means of demodulation by the demodulation section 106.

In ST602, the target SIR value setting section 108 further compares the acquired received data quality with the desired quality, and sets a target SIR value.

If the result of this comparison shows that the received data quality is better than the desired quality, in ST603 the target SIR value control section 501 determines whether a target SIR lower limit value has been set. If a target SIR lower limit value has been set, in ST604 the target SIR value control section 501 determines whether or not the difference value obtained by subtracting a first value from the target SIR value exceeds the target SIR lower limit value.

If the result is that the difference value exceeds the target SIR lower limit value, in ST605 the value obtained by decreasing the target SIR value by the first value is set in the target SIR value holding section 110 as the target SIR value. If, on the other hand, the difference value is equal to or less than the target SIR lower limit value, in ST606 the target SIR value is set directly in the target SIR value holding section 110.

If it is determined in ST603 that a target SIR lower limit value has not been set, the value obtained by decreasing the target SIR value by the first value is set in the target SIR value holding section 110 as the target SIR value.

If it is determined in ST602 that the received data quality is poorer than the desired quality, in ST607 the target SIR value control section 501 increases the target SIR value by a predetermined second value, and sets the target SIR value obtained in this way in the target SIR value holding section 110.

Thus, according to a base station apparatus using the transmission power control apparatus of Embodiment 2 of the present invention, a lower limit value is provided for the target SIR value, and control can be performed so that the target SIR value is not set to be equal to or less than the lower limit value. By this means, even if the width of fluctuations in received signal quality due to the propagation environment is large, it is possible to prevent a situation in which the target SIR value that is updated is greatly decreased and the required received SIR value cannot be ensured.

In other words, since the target SIR value that is updated is not greatly decreased even if the width of fluctuations in received signal quality due to the propagation environment is large, it is possible to ensure the required received SIR value when the target SIR value is next increased.

Therefore, even if the width of fluctuations in received signal quality due to the propagation environment is large, transmission power control can be made to track those large fluctuations, and consequently it is possible to ensure the required communication quality.

Moreover, by providing a margin for the required SIR value and setting a target SIR value for a transmitting station in which fluctuations in signal quality are large because fluctuations in the propagation environment are large, also, it is possible to obtain the same kind of effect as with control to prevent a fall to or below the above-described lower limit value.

Embodiment 3

Figure 7:
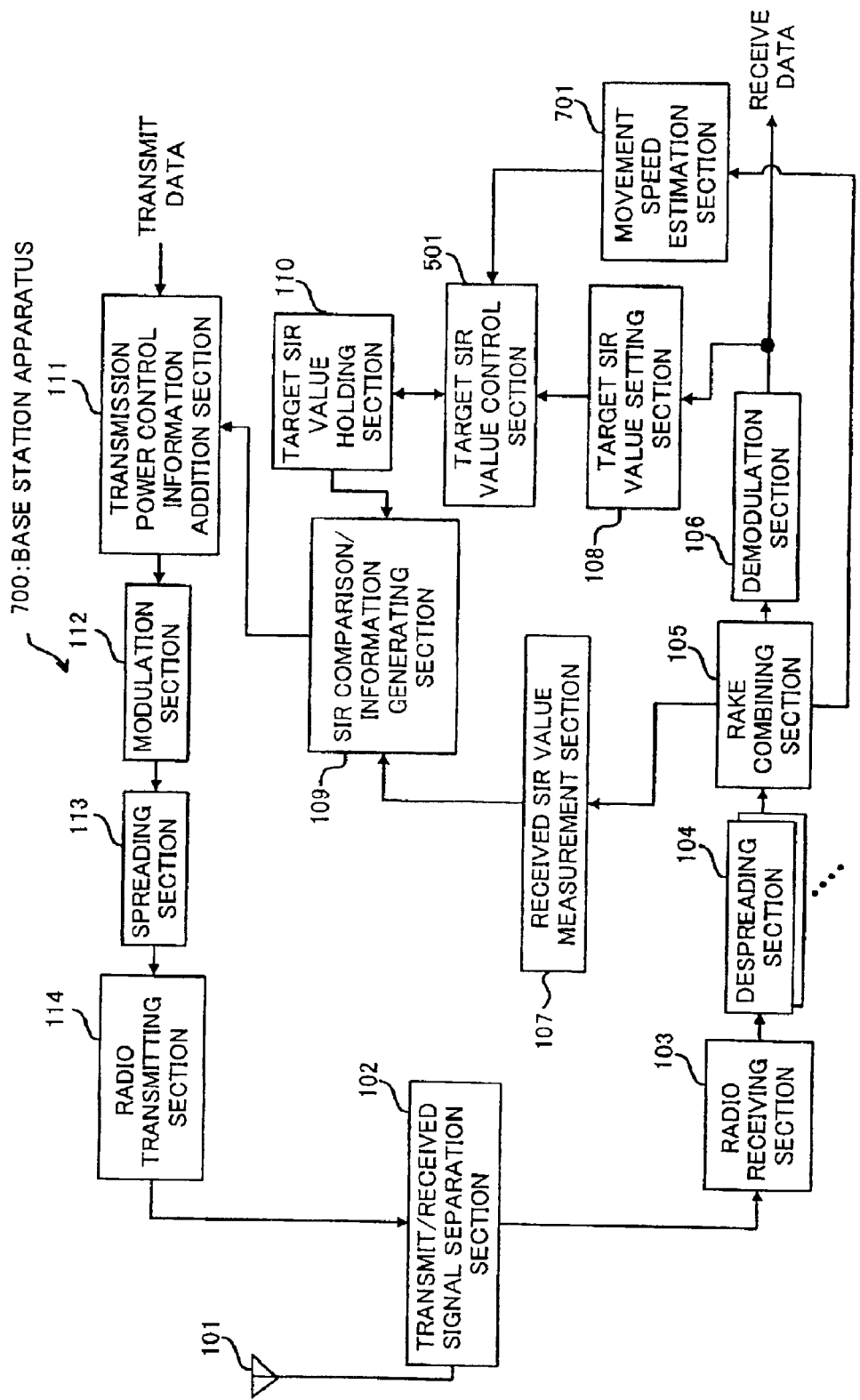
FIG. 7 is a block diagram showing the configuration of a base station apparatus using a transmission power control apparatus according to Embodiment 3 of the present invention.

FIG. 7 is a block diagram showing the configuration of a base station apparatus using a transmission power control apparatus according to Embodiment 3 of the present invention. Parts in FIG. 7 identical to those in FIG. 5 are assigned the same codes as in FIG. 5 and their detailed explanations are omitted.

A feature of Embodiment 3 is that, by providing a lower limit for a target SIR value setting according to the fluctuation width of movement speed for a transmitting station in which the fluctuation width of speed of movement is large—that is, a mobile station apparatus on the transmitting side in which signal quality fluctuations are large because fluctuations in the propagation environment are large—and not setting the target SIR value excessively low, transmission power control is operated efficiently and the required communication quality is ensured even if the propagation environment deteriorates rapidly.

The base station apparatus 700 shown in FIG. 7 differs from the base station apparatus 500 in FIG. 5 in having, in addition to the configuration elements of base station apparatus 500, a movement speed estimation section 701 connected between the RAKE combining section 105 and target SIR value control section 501.

The movement speed estimation section 701 estimates the speed of movement of a mobile station apparatus by measuring fluctuations in the received signal level from a mobile station from the output of the RAKE combining section 105, and outputs this speed of movement to the target SIR value control section 501.

If the fluctuation width—the difference between the minimum value and maximum value—of the speed of movement estimated within a certain period of time exceeds a predetermined threshold value, a target SIR lower limit value is provided, and control is performed so that the target SIR value is not set to be equal to or less than the target SIR lower limit value. Also, if that fluctuation width does not exceed the threshold value, control is performed to increase or decrease the target SIR value according to the communication quality in the same way as described in Embodiment 1.

Figure 8:
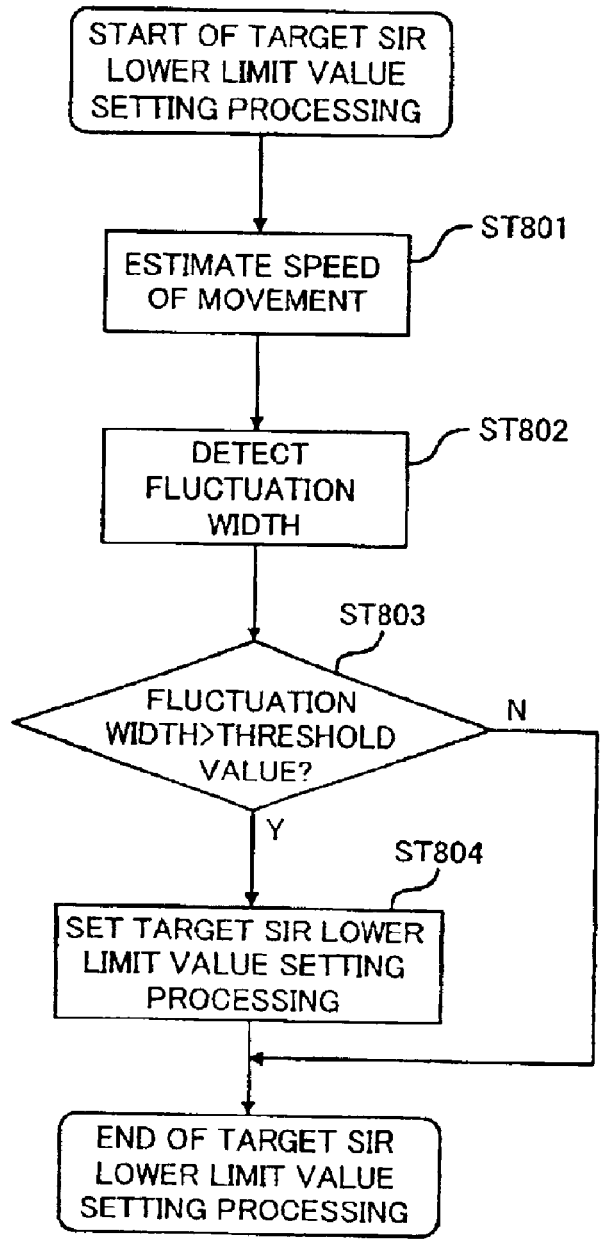
FIG. 8 is a flowchart for explaining the target SIR lower limit value setting operation in a base station apparatus using a transmission power control apparatus according to Embodiment 3 of the present invention.

Next, the operation of the movement speed estimation section 701 and target SIR value control section 501 will be described with reference to the flowchart in FIG. 8.

In ST801, the movement speed estimation section 701 estimates the speed of movement of the transmitting station apparatus from fluctuations in the level of the received signal demodulated by the demodulation section 106.

In ST802, the target SIR value control section 501 detects the fluctuation width of that estimated speed of movement, and in ST803, compares that fluctuation width with a threshold value.

If the result of the comparison shows that the fluctuation width exceeds the threshold value, in ST804 the target SIR value control section 501 sets a target SIR lower limit value. If the fluctuation width is equal to or less than the threshold value, target SIR lower limit value setting is not performed.

Thus, according to a base station apparatus using a transmission power control apparatus according to Embodiment 3, the speed of movement of a mobile station apparatus is estimated from fluctuations in the received signal level, and if the fluctuation width of that speed of movement exceeds a threshold value, a target SIR lower limit value is provided and control can be performed so that the target SIR value is not set to be equal to or less than the lower limit value.

By this means, even if the width of fluctuations in received signal quality due to the speed of movement is large, it is possible to prevent a situation in which the target SIR value that is updated is greatly decreased and the required received SIR value cannot be ensured. In other words, the target SIR value that is updated is not greatly decreased even if the width of fluctuations in received signal quality due to the speed of movement is large.

Therefore, even if the width of fluctuations in received signal quality due to the speed of movement is large, transmission power control can be made to track those large fluctuations, and consequently it is possible to ensure the required communication quality.

By providing a required SIR value with a margin to set a target SIR value for a mobile station apparatus in which variations in signal quality are large because changes in the speed of movement are large, it is possible to obtain the same effect as with control to prevent a received SIR value from being equal to or less than the above lower limit value.

As described above, in Embodiments 1 through 3, a configuration has been described in which a base station apparatus is equipped with transmission power control information generating means, and a mobile station apparatus is equipped with transmission power control means responsive to that transmission power control information. The same kind of effect as described above can also be obtained if, conversely, a mobile station apparatus is equipped with transmission power control information generating means, and a base station apparatus is equipped with transmission power control means.

Also, target and required Eb/N0 values may be used instead of target and required SIR values. Moreover, use in a similar way is also possible in an apparatus employing, instead of the CDMA method, a different modulation/demodulation method or multi-access method, such as a TDMA (Time Division Multiple Access) method or OFDM (Orthogonal Frequency Division Multiplex) method.

Furthermore, the amount of margin applied to a target SIR lower limit value or required SIR value may be made variable. That is to say, it is also possible to observe target SIR value fluctuations, received signal quality, and the like, over a long period, and control them adaptively.

AS is clear from the above descriptions, according to the present invention it is possible to prevent delay in updating of a target SIR value and to assure communication quality even in a case where the propagation environment deteriorates rapidly, when target SIR value updating is carried out at the time of transmission power control by means of comparison between a received SIR value and target SIR value.

This application is based on Japanese Patent Application No. 2000-089279 filed on Mar. 28, 2000, entire content of which is expressly incorporated by reference herein.

INDUSTRIAL APPLICABILITY

The present invention is suitable for use in a mobile telephone set, a mobile station apparatus such as an information terminal apparatus provided with mobile telephone functions and computer functions, or a base station apparatus that performs radio communication with a mobile station apparatus, or the like, in a mobile communication system.

What is claimed is:

1. A transmission power control apparatus comprising:
   a measurer that measures a received SIR value, which is a reception desired signal to interference ratio;
   a setter that sets a target SIR value decreased by a predetermined first value when a received signal quality is better than a desired quality, or sets said target SIR value increased by a second value that is greater than said first value if the received signal quality is poorer than said desired quality; and
   a generator that generates transmission power control information for implementing a directive to a communicating party to increase or decrease transmission power so that a difference between said received SIR value and said target SIR value is eliminated, wherein:
   when a difference between a maximum value and a minimum value of target SIR values in a past period exceeds a predetermined threshold value, the setter provides a lower limit value for the target SIR value and performs control so that the target SIR value is not set to be equal to or less than said lower limit value.

2. The transmission power control apparatus according to claim 1, wherein the setter sets the target SIR value by adding a margin to a required SIR value.

3. A transmission power control apparatus comprising:
   a measurer that measures a received SIR value, which is a reception desired signal to interference ratio;
   a setter that sets a target SIR value decreased by a predetermined first value when a received signal quality is better than a desired quality, or sets said target SIR value increased by a second value that is greater than said first value if the received signal quality is poorer than said desired quality;
   a generator that generates transmission power control information for implementing a directive to a communicating party to increase or decrease transmission power so that a difference between said received SIR value and said target SIR value is eliminated;
   an estimator that estimates a speed of movement of a mobile station apparatus; and
   a controller that, when a fluctuation width of said speed of movement exceeds a predetermined threshold value, provides a lower limit value for the target SIR value and performs control so that the target SIR value is not set to be equal to or less than said lower limit value.

4. A mobile station apparatus equipped with a transmission power control apparatus, said transmission power control apparatus comprising:
   a measurer that measures a received SIR value, which is a reception desired signal to interference ratio;
   a setter that sets a target SIR value decreased by a predetermined first value when a received signal quality is better than a desired quality, or sets said target SIR value increased by a second value that is greater than said first value if the received signal quality is poorer than said desired quality; and
   a generator that generates transmission power control information for implementing a directive to a communicating party to increase or decrease transmission power so that a difference between said received SIR value and said target SIR value is eliminated, wherein:
   when a difference between a maximum value and a minimum value of target SIR values in a past period exceeds a predetermined threshold value, the setter provides a lower limit value for the target SIR value and performs control so that the target SIR value is not set to be equal to or less than said lower limit value.

5. A base station apparatus equipped with a transmission power control apparatus, said transmission power control apparatus comprising:
   a measurer that measures a received SIR value, which is a reception desired signal to interference ratio;
   a setter that sets a target SIR value decreased by a predetermined first value when a received signal quality is better than a desired quality, or sets said target SIR value increased by a second value that is greater than said first value if the received signal quality is poorer than said desired quality; and a generator that generates transmission power control information for implementing a directive to a communicating party to increase or decrease transmission power so that a difference between said received SIR value and said target SIR value is eliminated, wherein:

when a difference between a maximum value and a minimum value of target SIR values in a past period exceeds a predetermined threshold value, the setter provides a lover limit value for the target SIR value and performs control so that the target SIR value is not set to be equal to or less than said lower limit value.

6. A transmission power control method comprising:

measuring received data quality;

updating a target SIR value by decreasing said target SIR value by a predetermined first value when said received data quality is better than a required quality, or by increasing said target SIR value by a second value that is greater than said first value when the received data quality is poorer than said required quality; and when a difference between a maximum value and a minimum value of a plurality of past updated target SIR values exceeds a predetermined threshold value, providing a lower limit value for the target SIR value and performing control so that the target SIR value is not updated to be equal to or below said lower limit value, and directing an increase or decrease in transmission power at a communicating party so that a difference between this updated target SIR value and a received SIR value which is a reception desired signal power to interference power ratio is eliminated.

7. The transmission power control method according to claim 6, further comprising, when the fluctuation width of speed of movement of a transmitting mobile station apparatus exceeds a predetermined threshold value, providing a lower limit value for the target SIR value and performing control so that the target SIR value is not updated to be equal to or below said lower limit value.

* * * * *